(12) United States Patent
Dorai et al.

(10) Patent No.: US 10,546,350 B2
(45) Date of Patent: Jan. 28, 2020

(54) PERFORMANCE PROJECTION (71) Applicant: International Business Machines Corporation, Armonk, NY (US)

(72) Inventors: Chitra Dorai, Chappaqua, NY (US); Roger D. Lederman, Braircliff Manor, NY (US); Xu Sun, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 948 days.

(21) Appl. No.: 14/961,941

(22) Filed: Dec. 8, 2015

(65) Prior Publication Data
US 2017/0161835 A1 Jun. 8, 2017

(51) Int. Cl.
*G06Q 40/00* (2012.01)
*G06Q 40/06* (2012.01)

(52) U.S. Cl.
CPC .............. *G06Q 40/06* (2013.01); *G06Q 40/00* (2013.01)

(58) Field of Classification Search
CPC ......... G06Q 40/00; G06Q 40/06; G06Q 40/10
See application file for complete search history.

(56) References Cited

U.S. PATENT DOCUMENTS

| 6,799,167 | B1 | 9/2004 | Gullen et al. |
| 7,171,385 | B1 | 1/2007 | Dembo et al. |
| 7,519,553 | B2 | 4/2009 | Abe et al. |
| 7,668,773 | B1* | 2/2010 | Pruitt .................... G06Q 40/06 705/36 T |
| 7,698,196 | B1 | 4/2010 | Rouvinez et al. |
| 2002/0091605 | A1 | 7/2002 | Labe, Jr. et al. |
| 2006/0195373 | A1 | 8/2006 | Flaxer et al. |
| 2009/0281958 | A1* | 11/2009 | Abidi .................... G06Q 40/06 705/36 R |
| 2011/0016067 | A1 | 1/2011 | Levchuk et al. |

(Continued)

FOREIGN PATENT DOCUMENTS

| EP | 2600250 A1 | 6/2013 |
| WO | 199606402 A1 | 2/1996 |

(Continued)

OTHER PUBLICATIONS

Wu-chang Luo, Spread Arbitrage between Stock Index Futures in Taiwan: A Cointegration Approach, Nov. 14, 2002, Department of Economics University of Southampton, web, 1-41 (Year: 2002).*

(Continued)

*Primary Examiner* — I Jung Liu
(74) *Attorney, Agent, or Firm* — Stephen R. Yoder; Gilbert Harmon, Jr.

(57) ABSTRACT

A method for projecting performance of a target asset compared to a benchmark, the method comprising receiving one or more target matrices corresponding to a target portfolio and one or more benchmark matrices corresponding to a benchmark portfolio, wherein the target matrices and benchmark matrices comprise elements corresponding to variables that influence portfolio performance trajectory, computing a target performance trajectory based on the one or more target matrices and a benchmark performance trajectory based on the benchmark matrices, identifying actions to bring the target performance trajectory above the benchmark performance trajectory; and communicating the identified actions.

17 Claims, 6 Drawing Sheets

(56) References Cited

U.S. PATENT DOCUMENTS

| | | |
|---|---|---|
| 2011/0082815 A1 | 4/2011 | Zosin et al. |
| 2011/0208564 A1 | 8/2011 | Ballow et al. |
| 2012/0053995 A1 | 3/2012 | D'Albis et al. |
| 2013/0024395 A1 | 1/2013 | Clark et al. |
| 2014/0081889 A1 | 3/2014 | Renshaw |
| 2014/0188763 A1* | 7/2014 | Willis .................... G06Q 40/06 705/36 R |
| 2015/0019458 A1 | 1/2015 | Dorai et al. |

FOREIGN PATENT DOCUMENTS

| | | |
|---|---|---|
| WO | 200068861 A2 | 11/2000 |
| WO | 2007040524 A1 | 4/2007 |
| WO | 2013023178 A1 | 2/2013 |

OTHER PUBLICATIONS

Abe et al., "Optimizing Debt Collections Using Constrained Reinforcement Learning", KDD'10, Jul. 25-28, 2010, Washington, DC, USA, Copyright 2010 ACM, 10 pages.

Chen et al., "Fund of Funds, Portable Alpha, and Portfolio Optimization", Spring 2009, The Journal of Portfolio Management, pp. 79-92.

Goyal et al., "Strategic Technology Choice and Capacity Investment Under Demand Uncertainty", The Wharton School, University of Pennsylvania, Philadelphia, PA, Nov. 2003, Revised Jul. 2004, pp. 1-46.

Iyengar, Garud N., "Robust Dynamic Programming", IEOR Department, Columbia University, New York, New York, Mathematics of Operations Research, vol. 30, No. 2, May 2005, pp. 257-280, © 2005 INFORMS.

Jun et al., "Strategic incentives in dynamic duopoly", Journal of Economic Theory 116 (2004) 249-281, © 2003 Elsevier, Received Apr. 5, 2000, final version received Aug. 21, 2003.

Marecki et al., "Solution Methods for Constrained Markov Decision Process with Continuous Probability Modulation", Proceedings of Conference on Uncertainty in Artificial Intelligence, 2013, printed on Jul. 13, 2015, 9 pages.

Miller et al., "Reaction Function Based Dynamic Location Modeling in Stackelberg-Nash-Cournot Competition", Newtw Spat Econ (2007), 7:77-97, published online: Dec. 21, 2006, © Springer Science + Business Media, LLC 2006.

Myerson, Roger B., "Optimal Auction Design", Mathematics of Operations Research, vol. 6, No. 1, Feb. 1981, Copyright © 1981, The Institute of Management Sciences, pp. 58-73.

Nilim et al., "Robust Control of Markov Decision Processes with Uncertain Transition Matrices", Operations Research, vol. 53, No. 5, Sep.-Oct. 2005, pp. 780-798, © 2005 INFORMS.

Puterman, Martin L., "Markov Decision Processes Discrete Stochastic Dynamic Programming", Copyright © 1994, 2005 by John Wiley & Sons, Inc., Published by John Wiley & Sons, Inc., Hoboken, New Jersey, 16 pages.

Weintraub et al., "Markov Perect Industry Dynamics with Many Firms", Journal of the Econometric Society, Econometrica, vol. 76, No. 6 (Nov. 2008), © 2008 The Econometric Society, pp. 1375-1411.

\* cited by examiner

| Month | Demand (X) | Units Produced (X) | Rate (X) | Production Cost (X) | Market Share (X) |
|---|---|---|---|---|---|
| 1 | 14.6 | 10.8 | 9.86 | 2.66 | 0.52 |
| 2 | 14.4 | 10.7 | 9.88 | 2.7 | 0.5 |
| 3 | 14.8 | 10.8 | 9.93 | 2.39 | 0.49 |
| 4 | 14.7 | 10.9 | 9.96 | 2.42 | 0.48 |
| 5 | 14.6 | 10.2 | 9.93 | 2.41 | 0.51 |
| 6 | 14.7 | 10.4 | 9.92 | 2.38 | 0.5 |

FIG. 4A

| Month | Demand (X) | Units Produced (X) | Rate (X) | Production Cost (X) | Market Share (X) |
|---|---|---|---|---|---|
| 1 | 14.6 | 7.2 | 10.26 | 2.46 | 0.38 |
| 2 | 14.4 | 7.1 | 10.28 | 2.47 | 0.4 |
| 3 | 14.8 | 7.2 | 10.33 | 2.49 | 0.41 |
| 4 | 14.7 | 7.3 | 10.36 | 2.52 | 0.42 |
| 5 | 14.6 | 7.6 | 10.33 | 2.51 | 0.39 |
| 6 | 14.7 | 7.8 | 10.32 | 2.48 | 0.4 |

| S.No. | Humidity (?) | Air Density (?) | Pressure (?) | Temperature (?) | Altitude (?) |
|---|---|---|---|---|---|
| 1 | 14.6 | 7.2 | 11.42 | 2.46 | 0.38 |
| 2 | 14.4 | 7.1 | 11.44 | 2.47 | 0.4 |
| 3 | 14.8 | 7.2 | 11.49 | 2.49 | 0.41 |
| 4 | 14.7 | 7.3 | 11.52 | 2.52 | 0.42 |
| 5 | 14.6 | 7.6 | 11.49 | 2.51 | 0.39 |
| 6 | 14.7 | 7.8 | 11.48 | 2.48 | 0.4 |

PERFORMANCE PROJECTION

BACKGROUND OF THE INVENTION

The present invention relates generally to the field of data processing, and more particularly to improving a performance trajectory such that it exceeds a benchmark trajectory.

Performance analysis for an asset or a collection of assets plays an important role in a number of industries. The assets could be a credit card, a mortgage, a personal loan, a student loan, or a resource in an enterprise, including even people. For these kinds of assets, performance is measured and characterized according to a well-defined set of metrics that are generally agreed upon within the industry. For an asset of interest, these performance metrics are often compared against the performance metrics of either competitors or industry performance levels. These competitor or industry metrics are often referred to as benchmarks.

SUMMARY

A method for projecting performance of a target asset compared to a benchmark, the method comprising receiving one or more target matrices corresponding to a target portfolio and one or more benchmark matrices corresponding to a benchmark portfolio, wherein the target matrices and benchmark matrices comprise elements corresponding to variables that influence portfolio performance trajectory, computing a target performance trajectory based on the one or more target matrices and a benchmark performance trajectory based on the benchmark matrices, identifying actions to bring the target performance trajectory above the benchmark performance trajectory; and communicating the identified actions. A computer program product and computer system corresponding to the method are also disclosed.

DETAILED DESCRIPTION

Figure 1:
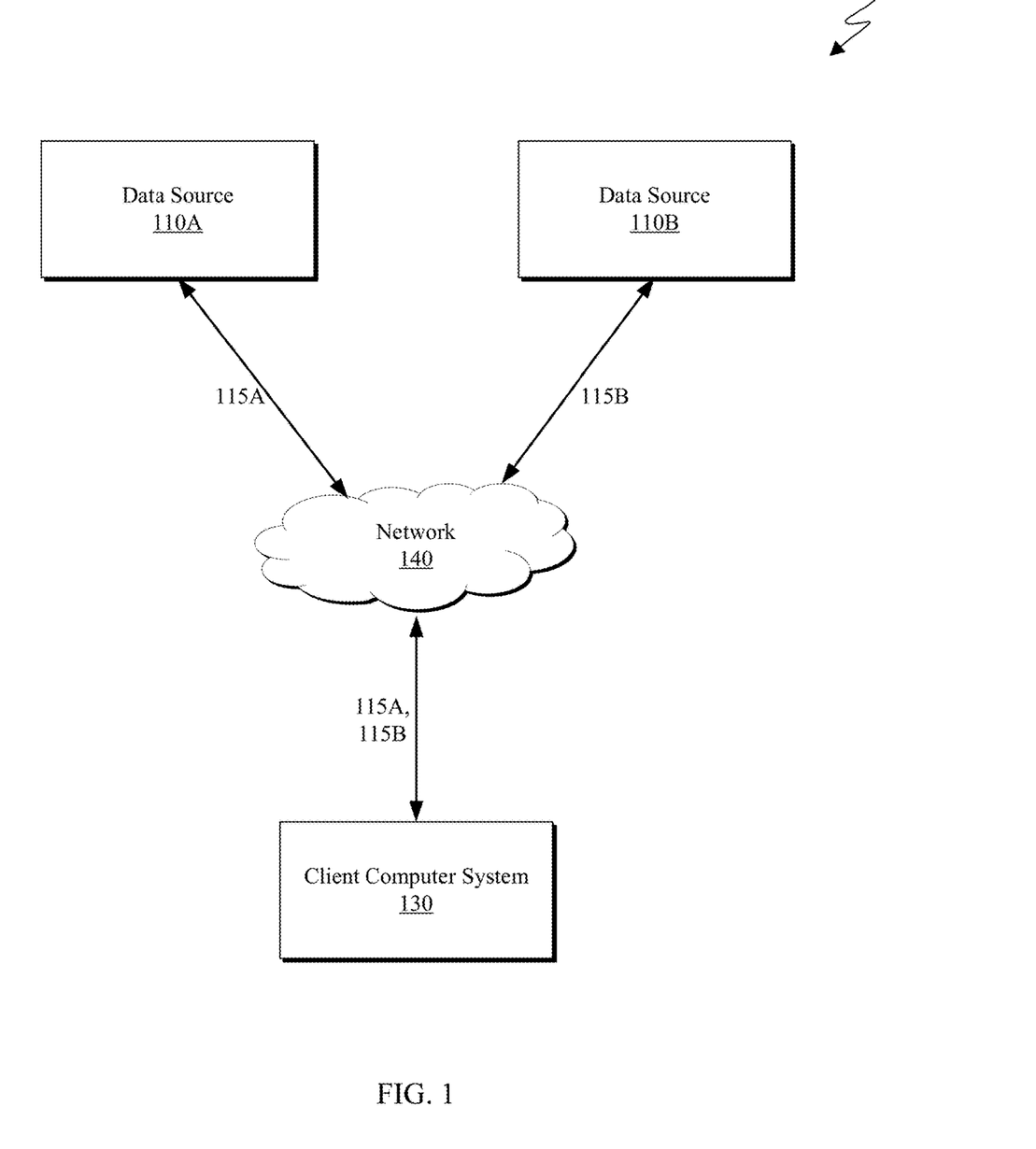
FIG. 1 is a block diagram depicting one example of a performance projection system in accordance with some embodiments of the present invention.

FIG. 1 is a block diagram depicting one example of a performance projection system 100 in accordance with some embodiments of the present invention. As depicted, performance system 100 includes one or more data sources 110 (e.g., 110A and 110B), a client computer system 130, and a network 140. Performance projection system 100 may enable asset performance projection with respect to a benchmark projection. Performance projection system 100 may additionally identify actions to improve the asset's performance projection and bring it above the benchmark projection.

Data sources 110 may be any source through which portfolio performance information is available. In one embodiment, data source 110A is a source through which data corresponding to a target portfolio is available, and data source 110B is a source through which data corresponding to a benchmark portfolio is available. The data provided by data sources 110 may include historical performance data corresponding to one or more portfolios. In some embodiments, the data provided by data sources 110 include market conditions that may impact portfolio performance. Data sources 110 may further provide data corresponding to controllable elements that may impact a portfolio's performance, which may include relevant prices, production metrics, employment metrics, or other operational variables, depending on the focus of the portfolio.

Figure 3:
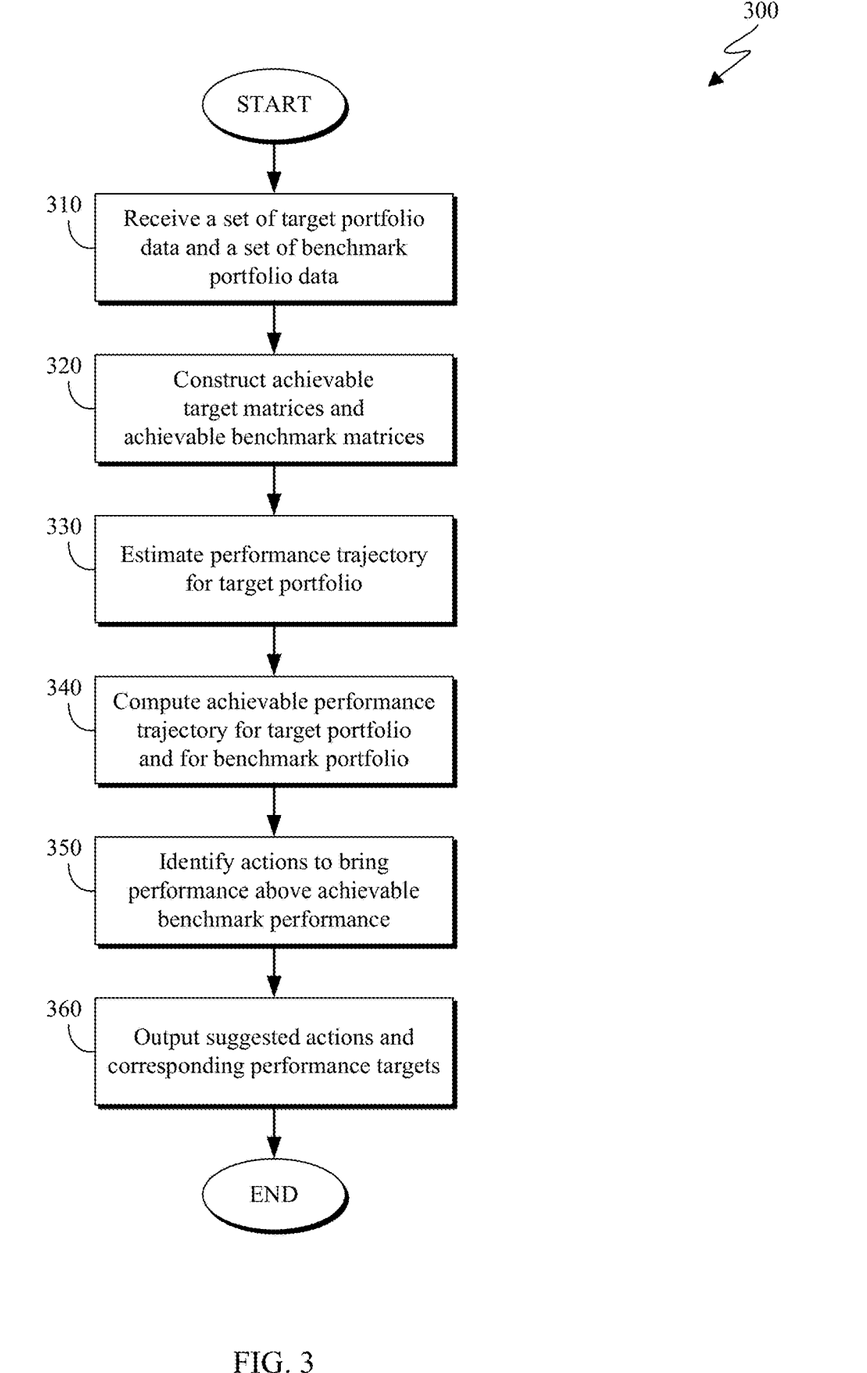
FIG. 3 is a flowchart depicting one example of an performance improvement method in accordance with some embodiments of the present invention.
Figure 6:
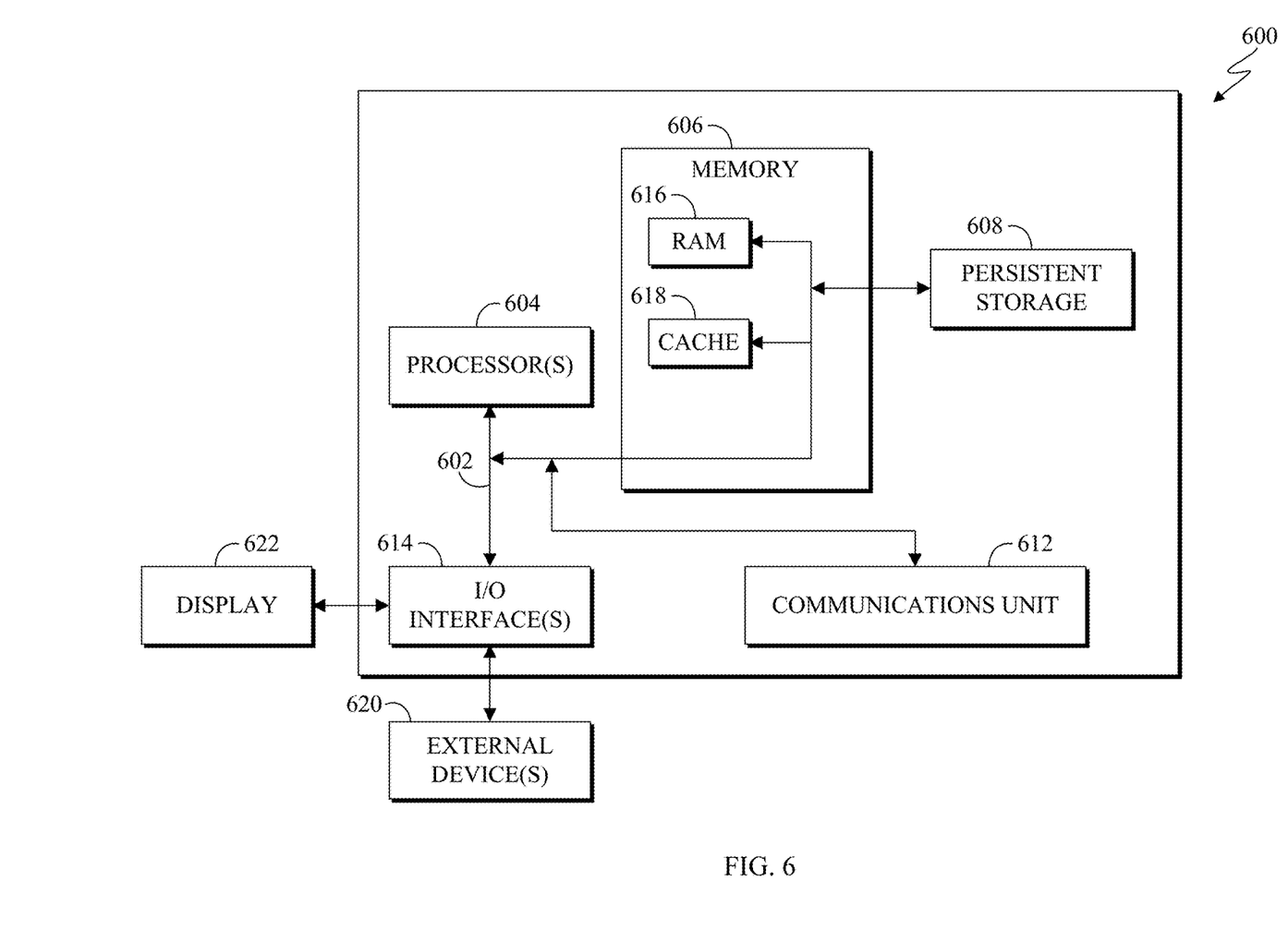
FIG. 6 depicts a block diagram of one example of a computer, in accordance with some embodiments of the present invention.

Client computer system may be a computer system configured to execute a performance improvement method, such as the computer system described in greater detail with respect to FIG. 6, and the performance improvement method described with respect to FIG. 3. Client computer system 130 may be a desktop computer, laptop computer, specialized computer server, or any other computer system known in the art. In some embodiments, client computer system 130 represents a computer system utilizing clustered computers and components to act as a single pool of seamless resources when accessed through network 150. In general, client computer system 130 is representative of any electronic devices, or combination of electronic devices, capable of executing machine-readable program instructions, as described in greater detail with regard to FIG. 6.

Network 150 can be, for example, a local area network (LAN), a wide area network (WAN) such as the Internet, or a combination of the two, and include wired, wireless, or fiber optic connections. In general, network 150 can be any combination of connections and protocols that will support communications between client computer system 130 and data sources 110 in accordance with an embodiment of the present invention.

Figure 2:
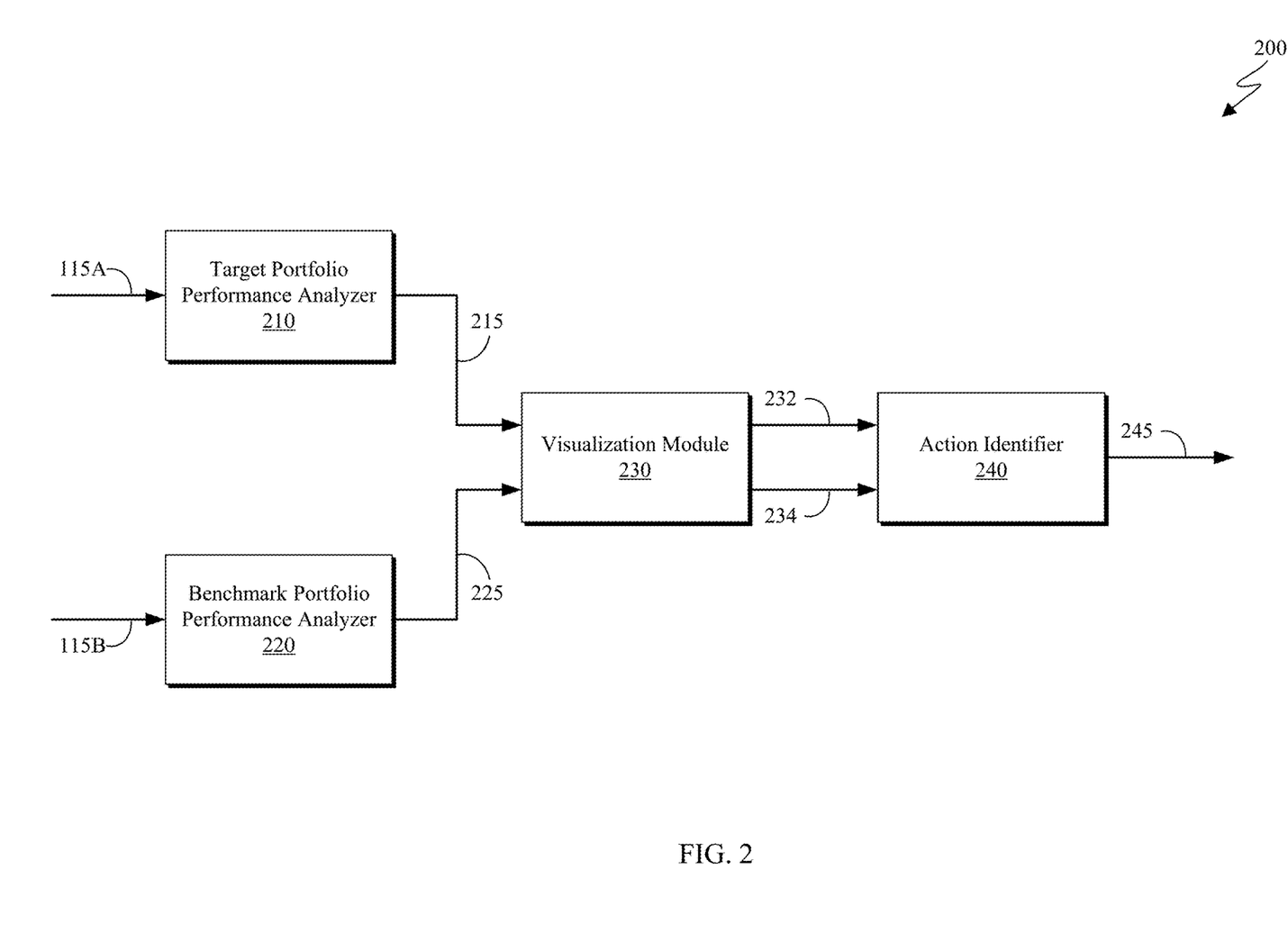
FIG. 2 is a block diagram depicting one example of an action identification system in accordance with some embodiments of the present invention.

FIG. 2 is a block diagram depicting one embodiment of an action identification system 200 in accordance with some embodiments of the present invention. As depicted, action identification system 200 includes a target portfolio performance analyzer 210, a benchmark portfolio performance analyzer 220, a visualization module 230, and an action identifier 240. Action identification system 200 may provide a set of actions to bring a target portfolio performance trajectory above a benchmark portfolio performance trajectory.

Target portfolio performance analyzer 210 may be configured to receive target portfolio data 115A from a data source such as data source 110A as described with respect to FIG. 1. Target portfolio data 115A may include data corresponding to market conditions that may impact portfolio performance. In some embodiments, target portfolio data 115A includes historical data corresponding to the target portfolio's performance. Target portfolio data 115 may additionally include data corresponding to controllable elements that may impact a portfolio's performance, which may include prices, production metrics, employment metrics, or other operational variables, depending on the focus of the portfolio. In some embodiments, target portfolio performance analyzer 210 is configured to construct a set of target portfolio state transition matrices, wherein each transition matrix comprises variables corresponding to the received target portfolio data 115. The target portfolio performance analyzer 210 may construct projected trend target portfolio transition matrices reflecting current performance trends, as well as current market conditions and controllable elements when available. The target portfolio performance analyzer 210 may also construct projected achievable target portfolio transition matrices, reflecting best-case performance. In some embodiments, achievable target portfolio transition matrices are computed using robust optimization approaches which do not require knowledge of current or historical controllable performance elements.

Benchmark portfolio performance analyzer 220 may be configured to receive benchmark portfolio data 115B from a data source such as data source 110B as described with respect to FIG. 1. Benchmark portfolio data 115B may include data corresponding to market conditions that may impact portfolio performance. In some embodiments, benchmark portfolio data 115B includes historical data corresponding to the benchmark portfolio's performance. Benchmark portfolio data 115B may additionally include data corresponding to controllable elements that may impact a portfolio's performance, which may include relevant prices, production metrics, employment metrics, or other operational variables, depending on the focus of the portfolio. In some embodiments, benchmark portfolio performance analyzer 220 is configured to construct a set of benchmark portfolio state matrices, wherein each transition matrix comprises variables corresponding to the received benchmark portfolio data 115B. The benchmark portfolio performance analyzer 210 may construct projected achievable benchmark portfolio transition matrices, reflecting best-case performance and corresponding to current performance trends, as well as current market conditions and controllable elements when available. In some embodiments, achievable benchmark portfolio transition matrices are computed using robust optimization approaches which do not require knowledge of current or historical controllable performance elements.

Visualization module 230 may be configured to receive target performance metrics 215 from target portfolio performance analyzer 210 and benchmark performance metrics 225 from benchmark portfolio performance analyzer 220. Visualization module 230 may further be configured to process the received performance metrics 215 and 225 to provide a target performance trajectory 232 and a benchmark performance trajectory 234. One example of the processing carried out by visualization module 230 is described with respect to FIG. 3. Visualization module 230 may be further configured to display target performance trajectory 232 and benchmark performance trajectory 234 to a user.

Action identifier 240 may be configured to receive target performance projection 232 and benchmark performance projection 234 from visualization module 230. In some embodiments, action identifier 240 may analyze target performance projection 232 with respect to benchmark performance projection 234 and identify any points at which target performance projection 232 falls below benchmark performance projection 234. Action identifier 240 may further be configured to identify actions that may bring target performance projection 232 above benchmark performance projection 234 if implemented. Action identification specifics are discussed in further detail with respect to FIG. 3.

FIG. 3 is a flowchart depicting a performance improvement method 300 in accordance with some embodiments of the present invention. As depicted, performance improvement method 300 includes receiving (310) a set of target portfolio data and a set of benchmark portfolio data, constructing (320) target matrices and benchmark matrices, computing (330) a performance trajectory for the target portfolio and a performance trajectory for the benchmark portfolio, identifying (340) actions to bring target performance above benchmark performance, and outputting (350) suggested actions and corresponding performance targets. Performance improvement method 300 may provide a set of actions capable of improving a target portfolio's performance to a point that matches or exceeds a benchmark portfolio's performance.

Receiving (310) a set of target portfolio data and a set of benchmark portfolio data may include receiving historical performance data corresponding to a target portfolio and historical data corresponding to a benchmark portfolio. In some embodiments, the received data includes data corresponding to market conditions that may impact portfolio performance. The received data may also include data corresponding to controllable elements that may impact a portfolio's performance, which may include relevant prices, production metrics, employment metrics, or other operational variables, depending on the focus of the portfolio.

Constructing (320) target matrices and benchmark matrices may include processing the received target portfolio data and benchmark portfolio data to provide one or more target matrices and one or more benchmark matrices. In one example, a target matrix comprises elements corresponding to variables that may influence the target portfolio's performance trajectory. In the same example, a benchmark matrix comprises elements corresponding to variables that may influence the benchmark portfolio's performance trajectory. These variables may include market conditions or data corresponding to controllable elements that may impact a portfolio's performance, which may include relevant prices, production metrics, employment metrics, or other operational variables, depending on the focus of the portfolio. In some embodiments, the target matrices and benchmark matrices may comprise multiple rows, wherein each row corresponds to a single variable such as price or a production metric, and each column corresponds to future realizations of the same set of variables at a different time for which the current variable values are relevant.

Computing (330) a target performance trajectory and a benchmark performance trajectory may include processing the one or more constructed target matrices and the one or more constructed benchmark matrices to estimate performance trajectories for the target portfolio and the benchmark portfolio. In some embodiments, wherein the target matrices and benchmark matrices correspond to variable values at different times, each row may be processed individually to provide a performance projection for each the target portfolio and the benchmark portfolio. When aggregated, these performance projections depict a target performance trajectory and a benchmark performance trajectory over the time interval to which the rows of the matrices correspond.

Identifying (340) actions to bring the target performance trajectory above the benchmark performance trajectory may include determining if the target performance trajectory is below the benchmark performance trajectory. In some embodiments, the benchmark performance trajectory and the target performance trajectory may be compared at the trajectory's endpoints. For example, if a client is aware the target portfolio is performing worse than the benchmark portfolio currently, they may be interested in seeing if the performance will adequately improve within six months. In that same example, the client may not be interested in the first five months as long as the target portfolio exhibits superior performance by the sixth month. In another embodiment, a client may want to see their target portfolio outperform a benchmark portfolio over the duration of an interval. In that case, the performance trajectories may be compared at all points during the interval of interest. If a point is identified where the target performance trajectory is below the benchmark performance trajectory, the target matrices and benchmark matrices may be analyzed to identify any differences that may cause the gap between the trajectories. For example, if all the variables in a target matrix and a benchmark matrix are the same except for a variable corresponding to price, and the benchmark matrix has a higher value for price than the target matrix, then the identified action may be to increase price in the target matrix to exceed that of the benchmark matrix.

Outputting (350) suggested actions and corresponding performance targets may include providing a user with at least one suggested action to eliminate a performance gap between the target performance trajectory and the benchmark performance trajectory. In some embodiments, a preferred suggested action is provided to the user. In other embodiments, a list of multiple suggested actions is provided to the user. The one or more suggested actions may be provided directly to another application for processing in addition to or instead of being provided to a user.

Figure 4A:
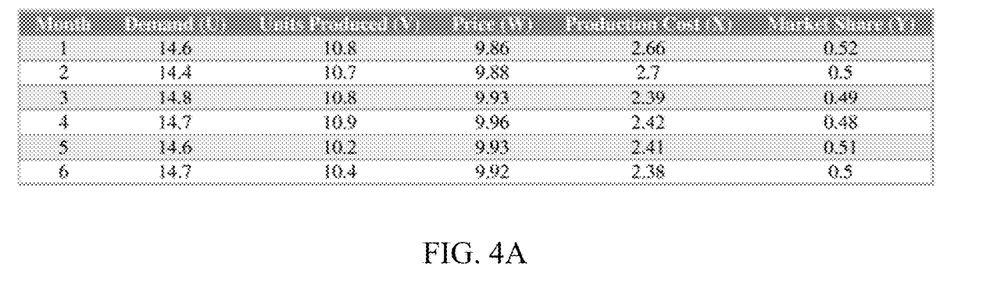
FIG. 4A is a table depicting performance metrics for a target asset in accordance with one embodiment of the present invention.

FIG. 4A is a table depicting performance metrics for a target asset in accordance with one embodiment of the present invention. As depicted, the table includes values corresponding to demand for the asset (U), the number of units of the asset produced (V), the price of the asset (W), the cost to produce the asset (X), and the market share of the asset (Y). Six months of data are included in the table. In the depicted embodiment, the values of some of the variables have been standardized. For example, both demand for the asset and the number of units of the asset produced are provided in decimal notation, but production of a fraction of a unit is not plausible. The real number of units produced is divided by 1,000 so all the variables are expressed on a similar scale. That is, 7.2 in the units produced column is indicative of 7,200 units produced. The data elements depicted in the table may be received from a data source such as data sources 110 depicted with respect to FIG. 1. The elements may be projections for the target asset over the next six months.

Figure 4B:
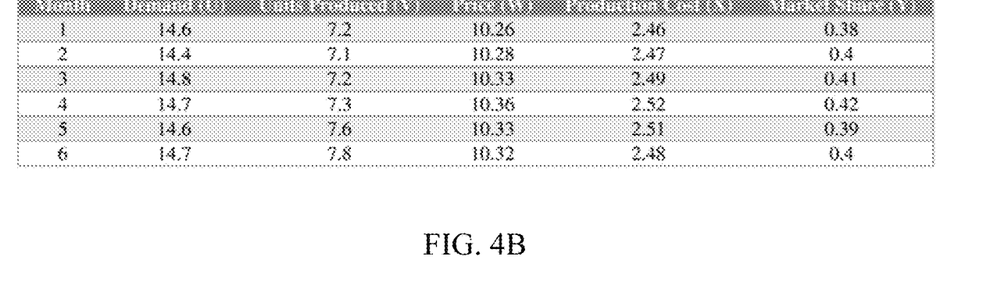
FIG. 4B is a table depicting performance metrics for a benchmark asset in accordance with one embodiment of the present invention.

FIG. 4B is a table depicting performance metrics for a benchmark asset in accordance with one embodiment of the present invention. As depicted, the table includes values corresponding to demand for the asset (U), the number of units of the asset produced (V), the price of the asset (W), the cost to produce the asset (X), and the market share of the asset (Y). These data categories match those depicted with respect to FIG. 4A, and correspond to projected values for the benchmark asset over the next six months.

Figure 4C:
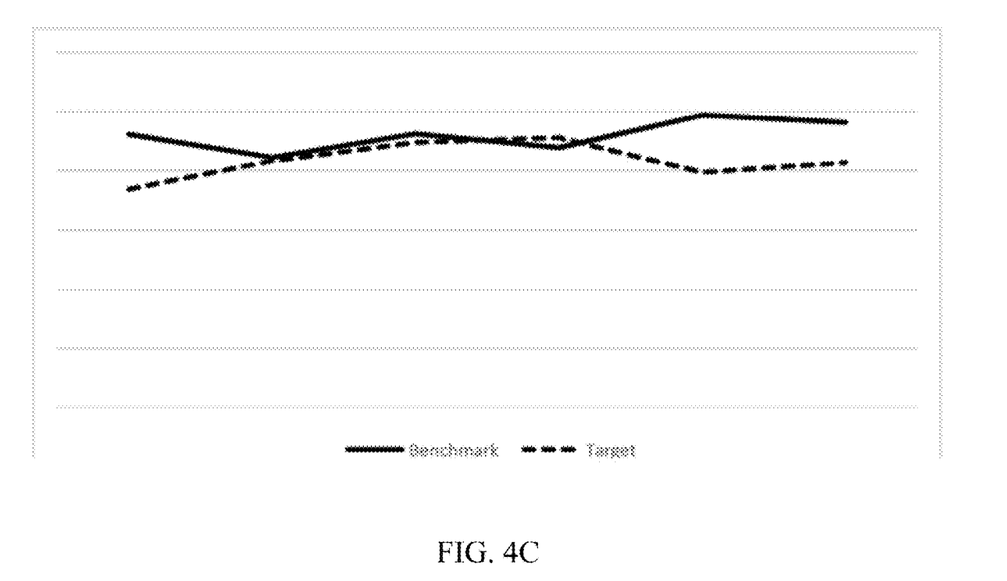
FIG. 4C is a graph depicting a target performance projection and a benchmark performance projection in accordance with one embodiment of the present invention.

FIG. 4C is a graph depicting a target performance projection and a benchmark performance projection in accordance with one embodiment of the present invention. The graph depicts a performance projection for each the target asset and the benchmark asset based on the performance metrics depicted with respect to FIG. 4A and FIG. 4B. In the depicted embodiment, the performance of each asset was calculated according to the equation:

$$P = U*Y*W - X*V \quad (1)$$

Equation 1, in this case, measures performance by calculating the difference between the financial gains resulting from the sale of units of the asset and the cost of producing however many units of the asset were produced.

Figure 5A:
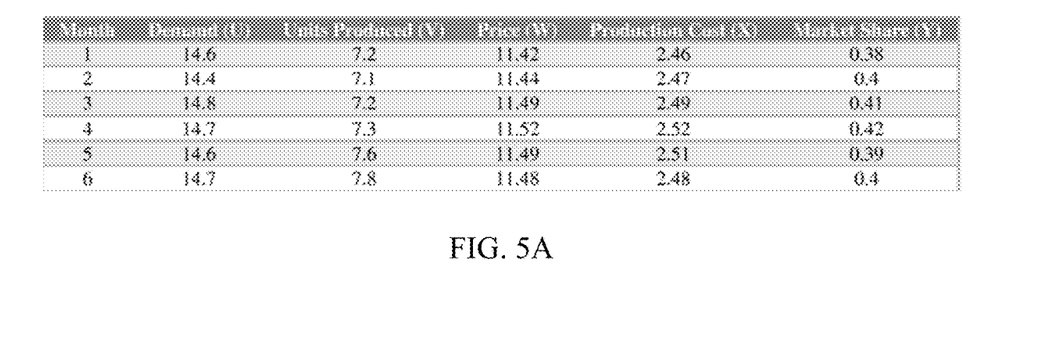
FIG. 5A is a table depicting performance metrics for a target asset in accordance with one embodiment of the present invention.

FIG. 5A is a table depicting updated performance metrics for a target asset in accordance with one embodiment of the present invention. As depicted, the table includes values corresponding to demand for the asset (U), the number of units of the asset produced (V), the price of the asset (W), the cost to produce the asset (X), and the market share of the asset (Y). The table depicted in FIG. 5A corresponds to the same target asset as the table depicted in FIG. 4A, but the values for the "Price" column have been adjusted to overcome the projected performance gap as depicted with respect to FIG. 4C. In this example, increasing the price of the asset may have been a suggested action because price is a controllable variable in the example. Another suggested action may have been to limit the number of units produced to reduce a net cost of production, but that result is not depicted in this example. The price increase depicted (+1.16 in each month) was calculated to guarantee the target projection would meet the benchmark projection in six months. In another embodiment not depicted, where the goal is to meet the benchmark projection every month and not just after six months, a price increase could be suggested that would bring the target projection above the benchmark projection for the entire six month period instead of only in the sixth month.

Figure 5B:
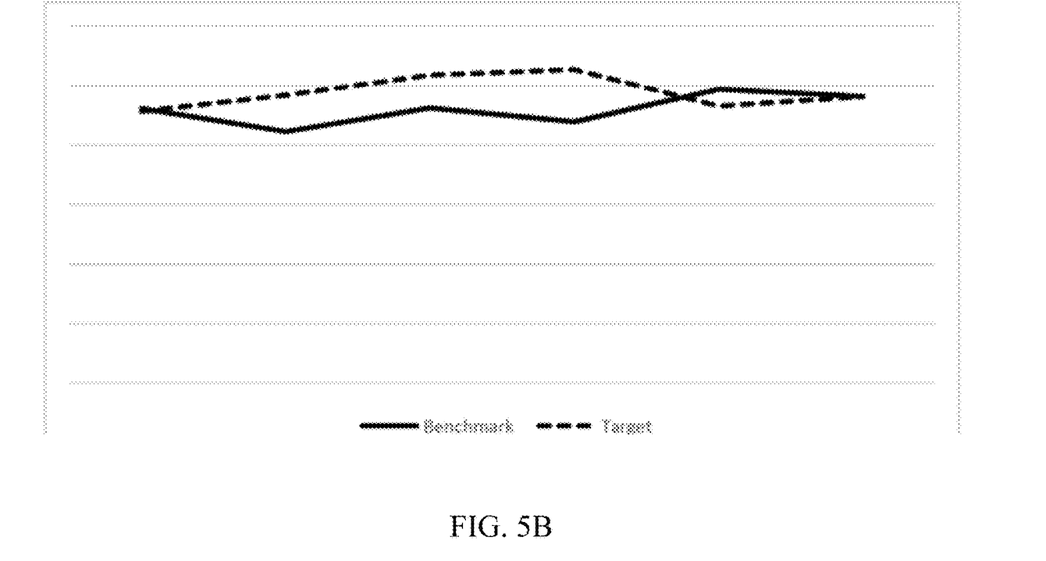
FIG. 5B is a graph depicting a target performance projection and a benchmark performance projection in accordance with one embodiment of the present invention.

FIG. 5B is a graph depicting an updated target performance projection and a benchmark performance projection in accordance with one embodiment of the present invention. The graph depicts a performance projection for each the target asset and the benchmark asset based on the performance metrics depicted with respect to FIG. 5A and FIG. 4B. As depicted, with the change in price as reflected in the table depicted in FIG. 5A, the target projection now meets the benchmark projection in the sixth month of the projections. In the depicted embodiment, the performance of each asset was calculated again according to the Equation 1. This type of model may be useful for a scenario where a potential investor wants the asset to reach a certain performance benchmark before they are willing to make invest, for example.

The embodiments disclosed herein can also offer performance projection insight with respect to more complicated projection models. For example, in one embodiment, a portfolio's performance $PP_t(r_t)$ may be calculated according to the equation:

$$PP_t(r_t) = v'_0 * R_1 * R_2 * \ldots * R_{t-1} * R_t(r_t) * R_{t+1} * \ldots * R_T * w \quad (2)$$

With respect to equation 2, $v_0$ corresponds to an initial asset state distribution vector of dimension d, $R_0, \ldots, R_{t-1}$ each correspond to a historical d×d transition matrix, $R_t(r_t)$ corresponds to a current period transition matrix with components represented as $r_t$, $R_{t+1}, \ldots, R_T$ correspond to forecast transition matrices through the end of time period T, and w corresponds to a weighting vector. An optimal performance projection may be calculated by determining a minimum asset portfolio performance $MPP_t$ according to the equation:

$$MPP_t = \min[PP_t(r^t_{metric}, r^t_{non-metric})$$

such that $r^t = \Sigma \lambda_n * r^n$ for $\lambda_n \geq 0, \Sigma \lambda_n = 1$ for $n = 1, \ldots, N$ $$r^t_{metric} = r^t_{metric}* \text{ and } \Sigma r^t_{ij} = 1, \text{ for all } i,j = 1, \ldots, d \quad (3)$$

With respect to equation 3, $r^t_{metric}$ corresponds to a metric transition matrix entry, which is an entry that is controllable by an asset holder, $r^t_{non\text{-}metric}$ corresponds to a non-metric transition matrix entry, which is an entry that is not controllable by an asset holder, $r^t_{metric}*$ corresponds to a transition matrix entry in which the metric entries are optimized to maximize $PP_t$, $\lambda_n$ corresponds to a weight attributed to an nth historical matrix component, and $r^n$ corresponds to a transition matrix which corresponds to an extreme instance of historical performance. By maximizing the performance projection in this regard, a robust maximum achievable performance projection may be derived from a combination of optimal controls, worst case conditions, and extreme historical performance instances.

FIG. 6 depicts a block diagram of components of computer 600 in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

As depicted, the computer 600 includes communications fabric 602, which provides communications between computer processor(s) 604, memory 606, persistent storage 608, communications unit 612, and input/output (I/O) interface(s) 614. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 616 and cache memory 618. In general, memory 606 can include any suitable volatile or non-volatile computer-readable storage media.

One or more programs may be stored in persistent storage 608 for access and/or execution by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 612, in these examples, provides for communications with other data processing systems or devices. In these examples, communications unit 612 includes one or more network interface cards. Communications unit 612 may provide communications through the use of either or both physical and wireless communications links.

I/O interface(s) 614 allows for input and output of data with other devices that may be connected to computer 600. For example, I/O interface 614 may provide a connection to external devices 620 such as a keyboard, keypad, a touch screen, and/or some other suitable input device. External devices 620 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 608 via I/O interface(s) 614. I/O interface(s) 614 also connect to a display 622.

Display 622 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   receiving one or more target matrices corresponding to a target portfolio and one or more benchmark matrices corresponding to a benchmark portfolio, wherein the target matrices and benchmark matrices comprise elements corresponding to variables that influence portfolio performance trajectory, and wherein the target matrices and the benchmark matrices include elements corresponding to market conditions that influence portfolio performance trajectory;
   computing a target performance trajectory based on the one or more target matrices and a benchmark performance trajectory based on the benchmark matrices;
   generating a visualization corresponding to the computed performance trajectory and the computed benchmark performance trajectory;
   identifying one or more prospective actions corresponding to the variables that influence portfolio performance trajectory to bring the target performance trajectory above the benchmark performance trajectory;
   computing an updated target performance trajectory with respect to the identified prospective actions;
   adjusting the visualization to reflect the updated target performance trajectory; and
   communicating the identified one or more prospective actions.

2. The method of claim 1, wherein the benchmark performance trajectory exhibits a desired performance trajectory.

3. The method of claim 1, further comprising receiving historical data corresponding to the target portfolio.

4. The method of claim 1, further comprising receiving historical data corresponding to the benchmark portfolio.

5. The method of claim 1, wherein the target performance trajectory is calculated based on historical performance trends of a target asset and the benchmark performance trajectory is calculated based on historical performance trends of a benchmark asset.

6. The method of claim 1, wherein the target performance trajectory is calculated based on a set of best achievable target performance metrics and the benchmark performance trajectory is calculated based on a set of best achievable performance metrics.

7. A computer program product comprising:
one or more non-transitory computer readable storage media and program instructions stored on the one or more computer readable storage media, the program instructions comprising instructions to:
receive one or more target matrices corresponding to a target portfolio and one or more benchmark matrices corresponding to a benchmark portfolio, wherein the target matrices and benchmark matrices comprise elements corresponding to variables that influence portfolio performance trajectory, and wherein the target matrices and the benchmark matrices include elements corresponding to market conditions that influence portfolio performance trajectory;
compute a target performance trajectory based on the one or more target matrices and a benchmark performance trajectory based on the benchmark matrices;
generate a visualization corresponding to the computed performance trajectory and the computed benchmark performance trajectory;
identify one or more prospective actions corresponding to the variables that influence portfolio performance trajectory to bring the target performance trajectory above the benchmark performance trajectory;
compute an updated target performance trajectory with respect to the identified prospective actions;
adjust the visualization to reflect the updated target performance trajectory; and
communicate the identified one or more prospective actions.

8. The computer program product of claim 7, wherein the benchmark performance trajectory exhibits a desired performance trajectory.

9. The computer program product of claim 7, further comprising program instructions to receive historical data corresponding to the target portfolio.

10. The computer program product of claim 7, further comprising program instructions to receive historical data corresponding to the benchmark portfolio.

11. The computer program product of claim 7, wherein the target performance trajectory is calculated based on historical performance trends of a target asset and the benchmark performance trajectory is calculated based on historical performance trends of a benchmark asset.

12. The computer program product of claim 7, wherein the target performance trajectory is calculated based on a set of best achievable target performance metrics and the benchmark performance trajectory is calculated based on a set of best achievable performance metrics.

13. A computer system comprising:
one or more computer processors;
one or more computer-readable storage media;
program instructions stored on the computer-readable storage media for execution by at least one of the one or more processors, the program instructions comprising instructions to:
receive one or more target matrices corresponding to a target portfolio and one or more benchmark matrices corresponding to a benchmark portfolio, wherein the target matrices and benchmark matrices comprise elements corresponding to variables that influence portfolio performance trajectory, and wherein the target matrices and the benchmark matrices include elements corresponding to market conditions that influence portfolio performance trajectory;
compute a target performance trajectory based on the one or more target matrices and a benchmark performance trajectory based on the benchmark matrices;
generate a visualization corresponding to the computed performance trajectory and the computed benchmark performance trajectory;
identify one or more prospective actions corresponding to the variables that influence portfolio performance trajectory to bring the target performance trajectory above the benchmark performance trajectory;
compute an updated target performance trajectory with respect to the identified prospective actions;
adjust the visualization to reflect the updated target performance trajectory; and
communicate the identified one or more prospective actions.

14. The computer system of claim 13, further comprising program instructions to receive historical data corresponding to the target portfolio.

15. The computer system of claim 13, further comprising program instructions to receive historical data corresponding to the benchmark portfolio.

16. The computer system of claim 13, wherein the target performance trajectory is calculated based on historical performance trends of a target asset and the benchmark performance trajectory is calculated based on historical performance trends of a benchmark asset.

17. The computer system of claim 13, wherein the target performance trajectory is calculated based on a set of best achievable target performance metrics and the benchmark performance trajectory is calculated based on a set of best achievable performance metrics.

* * * * *